UNITED STATES PATENT OFFICE 1,953,741

REACTION PRODUCTS OF GLYCOLS AND BORIC ACID AND METHOD OF PRODUCING THE SAME

Harry Bennett, Brooklyn, N. Y.

No Drawing. Application July 15, 1932,
Serial No. 622,822

13 Claim. (Cl. 260—98)

The invention relates to a novel organic compound and method of producing the same, and it has for an object to provide a reaction product of a glycol or other polyhydric alcohol and a weak water-soluble acid.

Further objects of the invention reside in the provision of a compound of this nature possessing properties of viscosity, elasticity, adhesiveness, hygroscopicity, solubility in water but insolubility in hydrocarbons, and electrical resistance; also, a product which is practically neutral, non-corrosive, non-toxic and antiseptic.

The novel product is obtained by reacting upon a gylcol or other polyhydric alcohol with various weak water-soluble acids, either organic or mineral. For example, such glycols as ethylene glycol, diethylene glycol, triethylene glycol, erythrol, etc., may be treated with boric acid in the manner hereinafter set forth; and there may be added thereto a flux such as sodium tetraborate. In accordance with the amount and nature of this flux added, whether neutral, acid or basic, variations in the character of the product will be effected, more especially with respect to the degree of solubility in water and organic solvents, also, as to stability, viscosity and adhesiveness, hygroscopicity, resistance to hydrolysis, and electrical resistance.

In preparing the novel product, a suitable polyhydric alcohol, preferably diethlene glycol, is heated together with a weak water-soluble acid such as boric acid, either under normal or reduced pressure and together with an excess of a flux such as sodium tetraborate, until the proper consistency is obtained as may be determined by a test sample in chilling the latter. The fluxing matter may, of course, be omitted, but the resulting product will be correspondingly thinner.

More specifically, 150 parts by weight of diethylene glycol may be heated to 100° C. with suitable agitation and to this is then added, while maintaining the agitation of the mixture, and in dry state, 70 parts by weight of boric acid together with 80 parts by weight of borax or a similar amount of mono-hydroxyethylamine. The latter may be added simultaneously with the boric acid or separately, but the addition in either case is not to be faster than the ready solution thereof. The heat is then gradually increased from 120° to 130° C.

A copious evolution of water vapor results; and, when this diminishes, the temperature is increased to 140–160° C. to drive off further amounts of combined water. The reaction is complete when the desired consistency is attained.

As another example, 100 parts by weight of triethylene glycol may be similarly heated to 100° C. with agitation and 90 parts by weight of boric acid and preferably 100 parts by weight of water added thereto while continuing the agitation, together with 10 parts by weight of zinc chloride. These ingredients are then heated to 150° C. until the desired consistency is obtained.

It will be understood, of course, that many variations of the reaction product are possible, as this product may be made up of other alcohols, polyalkyl glycols, ether polyhydroxy alcohols, or other polyhydric alcohols; also, in place of the borax there may be substituted alkali salts as carbonates, alkali hydroxids, amines as ethylamine, hydroxyamine, tri-hydroxyethylamine, and diamines such as ethylene diamine.

By varying the proportions of the ingredients making up the novel reaction product, different consistencies and conductivities thereof may be obtained.

The novel reaction product obtained as hereinbefore set forth will, on being heated, give off more or less moisture which is reabsorbed in whole or in part upon cooling of the said product.

The product is a more or less viscous syrup or resin of a colloidal nature, and is of high molecular weight and exceeding complexity. It is of a sticky, non-drying nature, and is practically tasteless, odorless and of a light amber color, or colorless. It may be made substantially insoluble in hydrocarbons although it is readily soluble in water. Moreover, it is practically neutral, non-corrosive, non-toxic and also antiseptic.

When heated above 275° F. the novel product begins losing water of crystallization, becoming harder and non-tacky. If the heating be continued, a water-soluble glass is formed which, however, goes into solution very slowly, but is extremely hygroscopic.

It is particularly adaptable as a flexibilizer or plasticizer for glues, gelatine, gum arabic, tragacanth or karaya. As an adhesive, it is non-drying and suitable for application to glass, leather, wood, textiles, etc.

The viscosity of aqueous solutions may be increased by dissolving the novel product therein, the same replacing glycerine and sugar for this purpose. It may be dissolved in methyl alcohol or in glycol ethers to be used as a special adhesive for glassine, cellophane, celluloid, etc.

Cosmetic preparations may utilize the product as a base or, in certain instances, it may serve directly as a cosmetic preparation; and in pharmaceutical preparations requiring a heavy base which can be washed off with water, it is particularly satisfactory.

This application is a continuation in part of a prior application for U. S. Letters Patent, Serial No. 533,575, filed by me April 28, 1931.

I claim:

1. A stable, readily water-soluble reaction product of a polyhydric alcohol and boric acid, said product being of a highly viscous, non-drying nature, and insoluble in hydrocarbons.

2. A stable, readily water-soluble reaction product of a glycol and boric acid, said product being of a highly viscous, non-drying nature, and insoluble in hydrocarbons.

3. A stable, readily water-soluble reaction product of diethylene glycol and boric acid, said product being of a highly viscous, non-drying nature, and insoluble in hydrocarbons.

4. A stable, readily water-soluble reaction product of triethylene glycol and boric acid, said product being of a highly viscous, non-drying nature, and insoluble in hydrocarbons.

5. A stable, water-soluble viscous reaction product of a glycol, boric acid and a reacting, catalyzing and fluxing electrolyte, said product being of a highly viscous, non-drying nature, and insoluble in hydrocarbons.

6. A stable, water-soluble viscous reaction product of a glycol, boric acid, and an alkaline reacting, catalyzing and fluxing electrolyte, said product being of a highly viscous, non-drying nature, and insoluble in hydrocarbons.

7. A reaction product of diethylene glycol, boric acid and borax.

8. A reaction product of triethylene glycol, boric acid and zinc chloride.

9. A reaction product made up of diethylene glycol, boric acid and borax, in the proportions by weight of 150 parts of diethylene glycol, 70 parts of boric acid and 80 parts of borax.

10. A reaction product made up of triethylene glycol, boric acid and zinc chloride in the proportions by weight of 100 parts of triethylene glycol, 90 parts of boric acid and 10 parts of zinc chloride.

11. The herein described method of producing a reaction product, which comprises heating with agitation diethylene glycol to 100° C., then adding thereto and while continuing the agitation boric acid, and gradually increasing the temperature to above 120° C.

12. The herein described method of producing a reaction product, which comprises heating with agitation diethylene glycol to 100° C., then adding thereto and while continuing the agitation boric acid, and gradually increasing the temperature to from 120° to 130° C.

13. The herein described method of producing a reaction product, which comprises heating with agitation diethylene glycol to 100° C., then adding thereto and while continuing the agitation boric acid and borax, and gradually increasing the temperature to above 120° C.

HARRY BENNETT.